UNITED STATES PATENT OFFICE 2,058,246

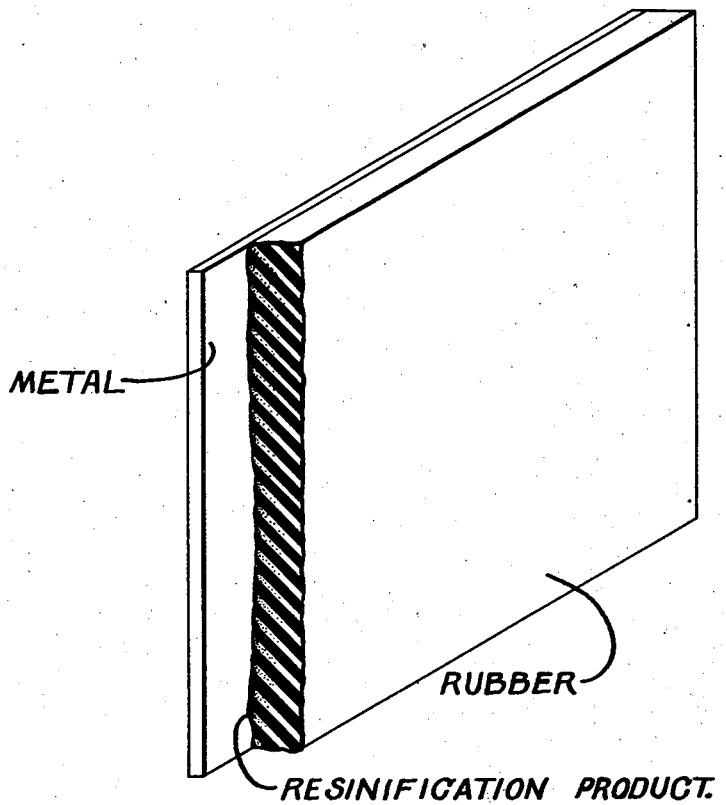

DIRECT BONDING OF RUBBER TO METAL

Willett J. McCortney, Royal Oak, Mich., assignor to Chrysler Corporation, Detroit, Mich., a corporation of Delaware Application April 12, 1933, Serial No. 665,647

27 Claims. (Cl. 18—59)

This invention relates to an improved composite rubber and metal article and particularly to an improved method and rubber composition for forming a direct bond between rubber and metal.

More specifically, my invention relates to direct bonding of rubber to ferrous metals.

Heretofore, it has been the practice to coat ferrous metal articles with brass, or other non-ferrous metals to which rubber can be vulcanized, before attempting to bond rubber thereto. In order to produce a secure or integral bond between the rubber and the metal coating, the vulcanization of the rubber has been conducted under pressure by a process not unlike that conventionally used in molding rubber articles from vulcanizable rubber. This process is not suitable for bonding rubber to many articles which are too large or wholly unadapted for the molding process in other structural characteristics such as strength and shape. The adhesion between rubber and metal produced by the use of dopes, such as semi-thermoplastic cements, has been found to be unsatisfactory for the reason that failure occurs at temperatures of substantially 150° F.

The main objects of my invention are to provide an improved vulcanizable rubber composition which bonds directly to ferrous metal during curing thereof; to provide a composition of this character which does not require the provision of brass or other non-ferrous metal coatings upon the surfaces of the articles to which it is to be secured; to provide bond forming ingredients in a rubber composition of this character which cause the composition to tenaciously adhere to ferrous metal surfaces after it has been cured or vulcanized, preferably by the application of heat while in intimate contact with such surfaces; and to provide suitable vulcanizing and accelerating agents in the vulcanizable rubber composition which are compatible with the bond forming ingredients and which do not in any way destroy their bond forming capacities.

Other objects of the invention are to provide an improved method for bonding rubber directly to ferrous metal and to provide an improved composite rubber and ferrous metal article having substantially integrally united component parts.

The drawing illustrates a composite rubber and ferrous metal article having substantially integrated component parts.

Although my improved method and composition are particularly adapted to facilitate the direct bonding of rubber to ferrous metal, both the method and composition may be used to advantage in obtaining a bond between rubber and any other metal.

My improved vulcanizable rubber composition is preferably provided with a bond forming ingredient selected from the organic rubber vulcanization accelerators, which have been classified as carbo-sulfhydryl polysulfide accelerators and in which is included carbo-sulfhydryl sulfides and thiocarbamic acids, salts, esters and condensation products of thiocarbamic acids, salts and esters which either contain the group $=C-SH$, or undergo reactions which tend to produce this group. Such compounds have a marked capacity for vulcanizing rubber and accelerating the vulcanization thereof and have heretofore been used in relatively small proportions in conjunction with accelerators, such as zinc, lead and calcium inorganic compounds, which activate their vulcanizing and accelerating properties for the purposes of both supplying sulphur for the curing of rubber and accelerating the curing reaction.

I have found that when the above mentioned bond forming ingredients are incorporated in a vulcanizable rubber composition which is provided with vulcanizing and accelerating agents that do not activate the vulcanizing and accelerating properties of such ingredients or have more than a slight activating effect thereon, a secure bond is obtained between the rubber composition and metal by causing the rubber composition to cure while in intimate contact with the metal. The best explanation that can be given at this time of the chemical reaction which takes place is that when the vulcanizing and accelerating properties of the selected carbo-sulf-hydryl sulfide are not activated, some of the latter resinifies while in contact with the metal, forming an infusible resinification product.

Any one of the following compounds, or combinations of two or more thereof, may be used as the bond forming ingredient of my improved vulcanizable rubber composition:

Tetramethylthiuramdisulfide
Tetraethylthiuramdisulfide
Tetramethylthiuramtetrasulfide
Tetramethylthiurammonosulfide
Dipentamethylenethiuramtetrasulfide
Piperidiniumpentamethylenedithiocarbamate
Zinc dimethyldithiocarbomate There are a vast number of primary accelerators which are capable of satisfactorily producing the desired reaction between rubber and sulphur, or other vulcanizing agent, and which do not activate the accelerating and vulcanizing properties of the above mentioned bond forming ingredients. The most satisfactory primary accelerators comprise organic compounds which in some instances may be used individually or in selected combinations. Mercaptobenzothiazole alone satisfactorily activates the vulcanizing agent of my improved composition and substantially equally as desirable results are derived by the following combinations of organic accelerators.

1. { Zinc butyl xanthate
     Aldehydeamine
2. { Zinc dimethyldithiocarbamate
     Aldehydeamine
3. { Piperidiniumpentamethylenedithiocarbamate
     Aldehydeamine
4. { Zinc dimethyldithiocarbamate
     Mercaptobenzothiazole For the purpose of lining tanks or securing rubber to ferrous metal articles which, by reason of their structural characteristics, such as size, shape and strength, are not adapted for the application of pressure, the following rubber composition is recommended:

| | Parts by weight |
|---|---|
| Rubber | 100 |
| Mercaptobenzothiazole | 1 |
| Albasan (a mixture of organic bases and beta-naphthol) | 1 |
| Stearic acid | 2 |
| Tetramethylthiuramdisulfide (or any of the above bond forming ingredients) | 5 |
| Sulfur | 3 |

The above ingredients are preferably thoroughly mixed in a mill using "pale crepe" as the rubber component and the resulting mass is then calendered to the desired thickness. Layers of this unvulcanized rubber composition are applied directly to the desired surfaces of the ferrous metal which have preferably been sand blasted, or cleaned in any suitable manner. Then the article to which the composition has been applied is placed in a chamber to which steam is admitted for the purpose of subjecting the rubber to a temperature of substantially 300° F. to 325° F. This heat treatment causes a curing reaction between the rubber and sulphur and simultaneously forms a bond between the ferrous metal and the rubber composition. The albasan (a mixture of organic bases and beta-naphthol) serves as an anti-oxidant or preservative and the stearic acid serves as a softener.

A vulcanizable compound having the following composition may be simultaneously cured and bonded to ferrous metal by heating it to from substantially 300° F. to 325° F. in the presence of air, as, for example, in a suitable oven or in open heating apparatus:

| | Parts by weight |
|---|---|
| Rubber (pale crepe) | 100 |
| Mercaptobenzothiazole | 1 |
| Zinc dimethyldithiocarbamate | 2 |
| Albasan (a mixture of organic bases and beta-naphthol) | 1 |
| Stearic acid | 2 |
| Tetramethylthiuramdisulfide (or any of the above bond forming ingredients) | 5 |
| Sulfur | 3 |

The above air curing composition is compounded in the same manner as the steam curing composition.

When it is desired to bond rubber to ferrous metal during a conventional molding process in which both heat and pressure are applied, the rubber compound is preferably provided with the following composition:

| | Parts by weight |
|---|---|
| Rubber (pale crepe) | 100 |
| Mercaptobenzothiazole | 1 |
| Manganese dioxide | 1 |
| Stearic acid | 2 |
| Tetramethylthiuramdisulfide (or any of the above bond forming ingredients) | 5 |
| Sulfur | 3 |

The manganese dioxide of this composition serves as an oxidizing agent and it is believed to assist in the resinification of the bonding ingredients during heating of the composition while in contact with the ferrous metal.

A composite rubber and ferrous metal article formed in accordance with my improved method appears in cross-section to have an intermediate film resembling a resinification product which tenaciously adheres to the ferrous metal and which is intimately incorporated with the rubber layer in a decreasing concentration from a maximum concentration at the side adjacent the ferrous metal.

The physical and chemical properties of the rubber layer may be controlled by the addition of any of the well-known loading or modifying ingredients which are conventionally used in rubber compositions for diverse purposes, so long as the materials added are such that they do not activate the vulcanizing and accelerating properties of the bond forming ingredient.

Although but several specific embodiments of my invention are herein set forth, it is understood that various changes in the materials employed and in the temperatures and periods of heating may be made without departing from the spirit of my invention, and it is not my intention to limit its scope other than by the terms of the appended claims.

What I claim is:

1. A vulcanizable rubber composition adapted to bond directly to metal upon curing while in intimate contact therewith including rubber, a bond forming ingredient selected from the carbo-sulfhydryl polysulfide class of organic vulcanization accelerators, and a vulcanization accelerating component having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

2. A vulcanizable rubber composition adapted to bond directly to ferrous metal upon curing while in intimate contact therewith including rubber, a vulcanizing agent, a bond forming ingredient selected from the carbo-sulfhydryl polysulfide class of organic vulcanization accelerators, and a vulcanization accelerating component having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

3. A vulcanizable rubber composition adapted to bond directly to ferrous metal upon heating while in intimate contact therewith including rubber, a vulcanizing agent, an oxidizing agent, a bond forming ingredient selected from the carbo-sulfhydryl polysulfide class of organic vulcanization accelerators, and a vulcanization accelerating component having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

4. A vulcanizable rubber composition adapted to bond directly to ferrous metal upon heating while in intimate contact therewith including rubber, a vulcanizing agent, a bond forming ingredient comprising a thiuram sulfide, and a vulcanization accelerating component having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

5. A vulcanizable rubber composition adapted to bond directly to ferrous metal upon heating while in intimate contact therewith including rubber, a bond forming ingredient selected from the carbo-sulfhydryl polysulfide class of organic vulcanization accelerators, a vulcanizing agent, and a vulcanization accelerating component consisting of an organic compound or compounds having substantially not more than a slight activating effect upon the vulcanizing and accelerating properties of said bond forming ingredient as compared with inorganic zinc, lead and calcium accelerating compounds.

6. A vulcanizable rubber composition adapted to bond directly to ferrous metal upon heating while in intimate contact therewith including rubber, a bond forming ingredient comprising a tetra-alkylthiurampolysulfide, a vulcanizing agent, and a vulcanization accelerating component having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

7. A vulcanizable rubber composition adapted to bond directly to ferrous metal upon heating while in intimate contact therewith including rubber, a bond forming ingredient comprising tetramethylthiuramdisulfide, a vulcanizing agent, and a vulcanization accelerating component having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

8. A vulcanizable rubber composition adapted to bond directly to ferrous metal upon heating while in intimate contact therewith including rubber, a bond forming ingredient comprising tetramethylthiurammonosulfide, a vulcanizing agent, and a vulcanization accelerating component having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

9. An article including a ferrous metal element and a layer of rubber composition on a surface thereof, said rubber composition having a resinification product of a compound of the carbo-sulfhydryl polysulfide class of organic vulcanization accelerators incorporated therein and rigidly bonded to said ferrous metal element.

10. An article including a ferrous metal element and a layer of rubber composition on a surface thereof, said rubber composition having a resinification product of a tetraalkylthiuram polysulphide incorporated therein and rigidly bonded to said ferrous metal element.

11. The method of bonding rubber directly to ferrous metal which comprises bringing a vulcanizable rubber composition having a bonding ingredient selected from the carbo-sulfhydryl polysulfide class of organic vulcanization accelerators into intimate contact with said ferrous metal and simultaneously curing said composition and resinifying said bonding ingredient.

12. The method of bonding rubber directly to ferrous metal which comprises bringing a vulcanizable rubber composition including a bonding ingredient selected from the carbo-sulfhydryl polysulfide class of vulcanization accelerators and a vulcanizing agent in contact with said ferrous metal, and activating said vulcanizing agent during heating of said composition while maintaining the vulcanizing and accelerating properties of said bond forming ingredient substantially ineffective.

13. The method of bonding rubber directly to ferrous metal which comprises bringing a vulcanizable rubber composition including a tetra-alkylthiurampolysulfide and a vulcanizing agent in contact with said ferrous metal, and activating said vulcanizing agent during heating of said composition while maintaining the accelerating and vulcanizing properties of said tetra-alkylthiuram polysulfide substantially ineffective whereby to cause resinification of said tetra-alkylthiuram polysulfide upon the surface of said ferrous metal.

14. An article including a ferrous metal element and a layer of rubber composition on a surface thereof, said rubber composition having a resinification product of a thiuram sulfide incorporated therein and rigidly bonded to said ferrous metal element.

15. An article including a ferrous metal element and a layer of rubber composition on a surface thereof, said rubber composition having a resinification product of a tetramethylthiuramsulfide incorporated therein and rigidly bonded to said ferrous metal element.

16. The method of bonding rubber directly to ferrous metal which comprises bringing a vulcanizable rubber composition including a thiuram sulfide and a vulcanizing agent in contact with said ferrous metal, and activating said vulcanizing agent during heating of said composition while maintaining the accelerating and vulcanizing properties of said thiuram sulfide substantially ineffective whereby to cause resinification of said thiuram sulfide upon the surface of said ferrous metal.

17. The method of bonding rubber directly to ferrous metal which comprises bringing a vulcanizable rubber composition including a tetramethylthiuramsulfide and a vulcanizing agent in contact with said ferrous metal, and activating said vulcanizing agent during heating of said composition while maintaining the accelerating and vulcanizing properties of said tetramethylthiuramsulfide substantially ineffective whereby to cause resinification of said tetramethylthiuramsulfide upon the surface of said ferrous metal.

18. A vulcanizable rubber composition adapted to bond directly to ferrous metal upon heating while in intimate contact therewith including rubber, a bond forming ingredient comprising tetramethylthiuramdisulfide, and a vulcanization accelerating component having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

19. A vulcanizable rubber composition adapted to bond directly to ferrous metal upon heating while in intimate contact therewith including rubber, a bond forming ingredient comprising a tetra-alkylthiurampolysulfide, and a vulcanization accelerating component having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

20. The method of bonding rubber directly to ferrous metal which comprises bringing a vulcanizable rubber composition including a tetra-alkylthiurampolysulfide in contact with said ferrous metal, and activating said tetra-alkylthiurampolysulfide during heating of said composition while maintaining the accelerating and vulcanizing properties of said tetra-alkylthiurampolysulfide substantially ineffective whereby to cause resinification of said tetra-alkylthiurampolysulfide upon the surface of said ferrous metal.

21. An article including a ferrous metal element and a layer of rubber composition on a surface thereof, said rubber composition having a resinification product of a tetra-methylthiuramdisulfide incorporated therein and rigidly bonded to said ferrous metal element.

22. The method of bonding rubber directly to ferrous metal which comprises bringing a vulcanizable rubber composition having a bonding ingredient including tetra-methylthiuramdisulfide into intimate contact with said ferrous metal and simultaneously curing said composition and resinifying said bonding ingredient.

23. An article including a ferrous metal element and a layer of rubber composition on a surface thereof, said rubber composition having a resinification product of a tetra-methylthiurammonosulfide incorporated therein and rigidly bonded to said ferrous metal element.

24. The method of bonding rubber directly to ferrous metal which comprises bringing a vulcanizable rubber composition having a bonding ingredient including tetra-methylthiurammonosulfide into intimate contact with said ferrous metal and simultaneously curing said composition and resinifying said bonding ingredient.

25. A vulcanizable rubber composition adapted to bond directly to ferrous metal upon heating while in intimate contact therewith including rubber, a bond forming ingredient comprising dipentamethylenethiuramtetrasulfide, a vulcanizing agent, and a vulcanization accelerating component having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

26. An article including a ferrous metal element and a layer of rubber composition on a surface thereof, said rubber composition having a resinification product of a dipentamethylenethiuramtetrasulfide incorporated therein and rigidly bonded to said ferrous metal element.

27. The method of bonding rubber directly to ferrous metal which comprises bringing a vulcanizable rubber composition having a bonding ingredient including dipentamethylenethiuramtetrasulfide into intimate contact with said ferrous metal and simultaneously curing said composition and resinifying said bonding ingredient.

WILLETT J. McCORTNEY.